(12) United States Patent
Goswami et al.

(10) Patent No.: US 12,084,371 B2
(45) Date of Patent: Sep. 10, 2024

(54) SYSTEMS AND METHODS FOR SOLAR THERMAL OSMOSIS DESALINATION

(71) Applicant: UNIVERSITY OF SOUTH FLORIDA, Tampa, FL (US)

(72) Inventors: D. Yogi Goswami, Tampa, FL (US); Martina Leveni, Tampa, FL (US); Eydhah Almatrafi, Jeddah (SA)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 18/554,447

(22) PCT Filed: Apr. 7, 2022

(86) PCT No.: PCT/US2022/023814
§ 371 (c)(1),
(2) Date: Oct. 6, 2023

(87) PCT Pub. No.: WO2022/216921
PCT Pub. Date: Oct. 13, 2022

(65) Prior Publication Data
US 2024/0101460 A1   Mar. 28, 2024

Related U.S. Application Data

(60) Provisional application No. 63/171,769, filed on Apr. 7, 2021.

(51) Int. Cl.
C02F 1/14    (2023.01)
C02F 1/44    (2023.01)
C02F 9/00    (2023.01)

(52) U.S. Cl.
CPC .............. *C02F 9/00* (2013.01); *C02F 1/14* (2013.01); *C02F 1/441* (2013.01); *C02F 1/445* (2013.01); *C02F 2201/009* (2013.01); *C02F 2303/10* (2013.01)

(58) Field of Classification Search
CPC .. C02F 1/14; C02F 1/441; C02F 1/445; C02F 9/00
See application file for complete search history.

(56) References Cited

U.S. PATENT DOCUMENTS

| 10,829,913 | B1 | 11/2020 | Ahmed et al. |
| 2011/0147284 | A1 | 6/2011 | Barker |
| 2016/0252279 | A1 | 9/2016 | Hui |
| 2021/0275967 | A1* | 9/2021 | Goodman .............. B01D 53/18 |

FOREIGN PATENT DOCUMENTS

WO    2022216921 A1    10/2022

OTHER PUBLICATIONS

International Search Report of related PCT/US22/23814 dated Jun. 30, 2022, 2 pages.

(Continued)

*Primary Examiner* — Bradley R Spies
(74) *Attorney, Agent, or Firm* — Quarles & Brady LLP

(57) ABSTRACT

Disclosed herein is a solar thermal osmosis desalination system comprising a forward osmosis subsystem and a reverse osmosis subsystem where the forward osmosis subsystem is configured to receive solar thermal heat and generate power that can be used to operate the reverse osmosis subsystem.

20 Claims, 1 Drawing Sheet

(56) References Cited

OTHER PUBLICATIONS

Written Opinion of related PCT/US22/23814, dated Jun. 30, 2022, 3 pages.
McGinnis, et al. "Pilot demonstration of the NH3/CO2 forward osmosis desalination process on high salinity brines." Desalination 312 (2013): 67-74.
Zhou, et al. "Water treatment capacity of forward-osmosis systems utilizing power-plant waste heat." Industrial & Engineering Chemistry Research 54.24 (2015): 6378-6389.
Aquaporin "Aquaporin Inside" Website retrieved on Apr. 22, 2024, from https://aquaporin.com/, 2 pages.
Forwardosmosistech "Forwardosmosistech at a Glance" retrieved on Apr. 22, 2024, https://www.forwardosmosistech.com/, 9 pages.

* cited by examiner

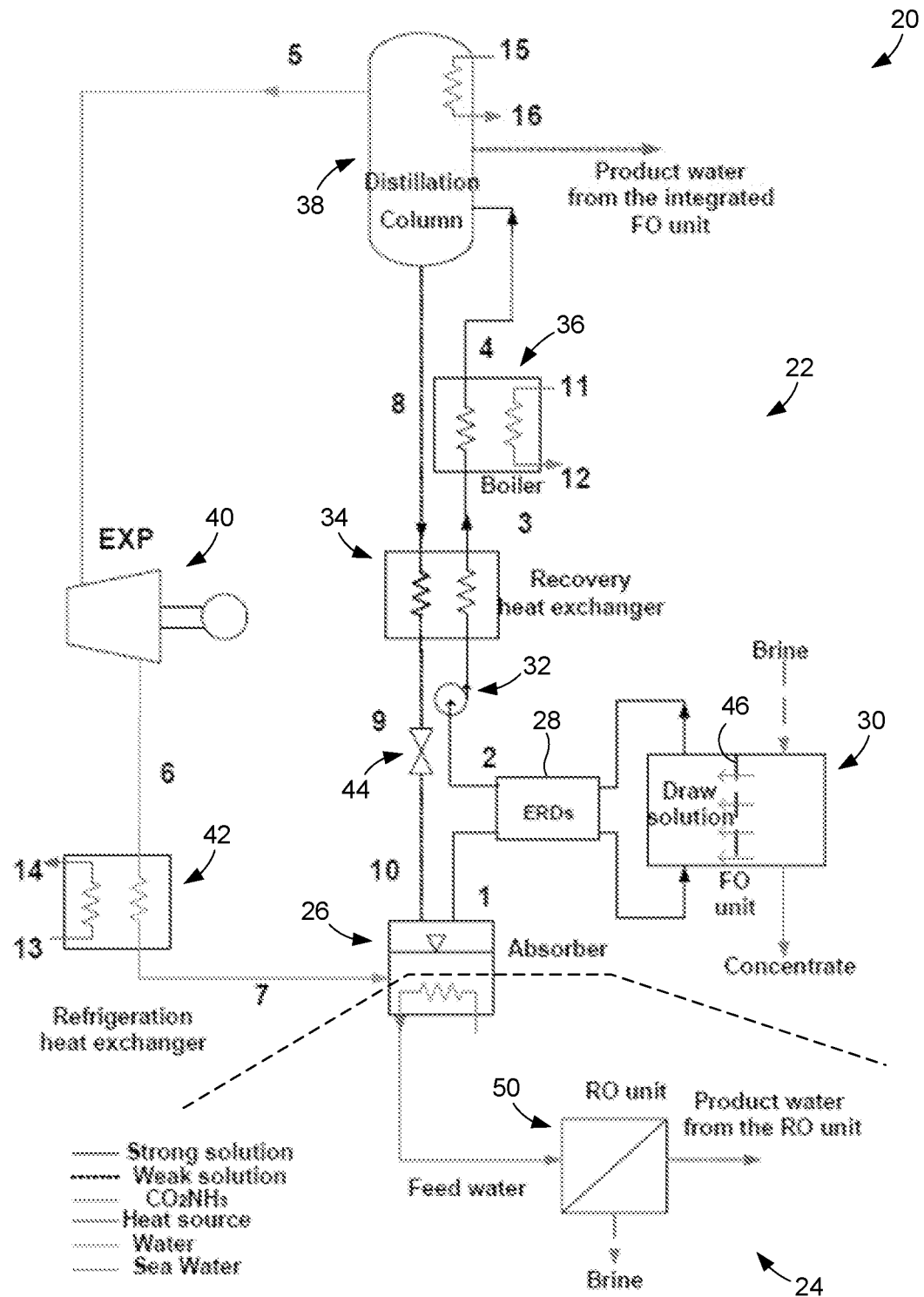

SYSTEMS AND METHODS FOR SOLAR THERMAL OSMOSIS DESALINATION

CROSS-REFERENCE TO RELATED APPLICATIONS

The present application is a US national phase of pending International Patent Application No. PCT/US2022/023814 filed on Apr. 7, 2022, which claims priority to U.S. Provisional Patent Application No. 63/171,769, filed Apr. 7, 2021, the entire contents of which are hereby incorporated by reference.

BACKGROUND OF THE INVENTION

Over the last few years, membrane-based reverse osmosis desalination has become commercially attractive because of its capital cost advantages. However, reverse osmosis has high electrical power requirements and cannot be used for water having high salinity concentration. In addition, the highly concentrated brine that is a byproduct of reverse osmosis poses significant environmental challenges.

Although forward osmosis desalination does not suffer from the salinity limitations of reverse osmosis, forward osmosis is not commercially viable because of its high cost and the residual solubility of the draw solution chemicals it requires.

In view of these facts, it can be appreciated that it would be desirable to have a system and method for desalination that overcomes one or more of the above-noted drawbacks of forward and reverse osmosis desalination.

BRIEF SUMMARY OF THE INVENTION

Disclosed herein is a hybrid desalination system that uses thermodynamically coupled forward osmosis (FO) and reverse osmosis (RO) subunits, where the FO subunits utilizes solar thermal power to produce electrical power that can be used to drive one or both of the osmosis desalination processes. In some embodiments, the FO subunit utilizes a Goswami cycle that produces power and cooling that can, for example, be used to cool product water output by the system. The desalination system utilizes advantages of each desalination process to overcome limitations of the other, and further reduces the amount of external electrical power typically required for osmosis desalination.

One aspect of the technology provides for a solar thermal osmosis desalination system comprising a forward osmosis subsystem and a reverse osmosis subsystem where the forward osmosis subsystem is configured to receive solar thermal heat and generate power that can be used to operate the reverse osmosis subsystem.

The forward osmosis subsystem comprises a working fluid, an absorber, and a distillation column in fluid communication by a strong solution path, a weak solution path, and a high-temperature path. The absorber is configured to output the working fluid by the strong solution path that comprises, in order, one or more energy recovery devices (ERDs), an forward osmosis (FO) unit, the one or more ERDs, a pump, a recovery heat exchanger, and a boiler that delivers the working fluid to the distillation column. The distillation column is configured to output the working fluid by the weak solution path that comprises, in order, the recovery heat exchanger and a pressure reducing valve that delivers the working fluid to the absorber and configured to output the working fluid by the high-temperature path that comprises, in order, a turbine and a refrigeration heat exchanger that delivers the working fluid to the absorber. The FO unit is configured to receive a FO feed brine on a first side of a semipermeable membrane that divides the FO unit into two sides, to receive the working fluid on a second side of the semipermeable membrane, and to deliver water from the FO feed brine through the semipermeable membrane to the working fluid.

The reverse osmosis system comprises a reverse osmosis (RO) unit and the absorber, wherein the RO unit is configured to receive a RO feed brine heated by the absorber and output RO product water.

In some embodiments, the working fluid comprises one or more solutes and water, e.g., a $CO_2$—$NH_3$—$H_2O$ solution. The relative proportion of each component of the working fluid depends on where the working fluid is in the system. Working fluid in the strong solution path can be characterized as having a high concentration of the solutes dissolved in water. Working fluid in the weak solution path may be characterized as having a lower concentration of solutes dissolved in water than the working fluid in the strong solution path because a proportion of the solutes are vaporized in the distillation column and proceeds through the high-temperature path. The strong solution is utilized with a draw solution to extract water from FO feed brine in the FO unit while the vapor is utilized to generate power at the turbine and optionally cooling at the refrigeration heat exchanger. The vapor may also be utilized at the absorber to heat RO feed water prior to reacting the RO unit.

The FO subsystem is configured to receive solar thermal heat that may be optionally collected using a low-grade solar thermal field. The solar thermal heat may be supplied to the forward osmosis subsystem through the boiler and/or distillation column. Heat within the distillation column is used the heat the working fluid, thereby vaporizing a portion of the working fluid so that it can be utilized to generate power and/or cooling. Heat within the distillation column may also be used to generate product water. The distillation column product water may be optionally delivered to the RO subsystem in RO feed water.

These and other aspects of the invention will be further described herein.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 1 illustrates an example embodiment of a solar thermal osmosis desalination system.

DETAILED DESCRIPTION OF THE INVENTION

As described above, it would be desirable to have a system and method for desalination that overcomes one or more of the drawbacks of forward and reverse osmosis desalination. Disclosed herein are examples of such a system and method. In some embodiments, the desalination system is a hybrid system that uses both forward osmosis and reverse osmosis, as well as a thermodynamic cycle that utilizes solar thermal power to produce electrical power that can be used to drive one or both of the osmosis desalination processes. In some embodiments, the thermodynamic cycle is a Goswami cycle that not only produces power but cooling that can, for example, be used to cool product water output by the system. When optimally designed, the desalination system utilizes advantages of each desalination process to overcome limitations of the other, and further reduces the amount of external electrical power typically required for osmosis desalination.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Disclosed herein is a solar thermal osmosis desalination system that presents a unique combination of the forward osmosis (FO) and reverse osmosis (RO) processes. Those processes are powered by solar energy that can be collected by a low-grade solar thermal field. In particular, the solar energy drives a thermodynamic cycle that, when configured as a Goswami cycle, produces both power and cooling. When a Goswami cycle is used in the system, each of the energy outflows from the cycle, including power, cooling, and rejected heat, can utilized to perform FO and RO desalination to produce fresh water, while managing the strong brine that is produced as a byproduct of the desalination processes. As will be apparent from the discussion that follows, the system eliminates the need for a separate water-cooled or air-cooled condenser normally needed for solar thermal power plants. In effect, the system uses the desalination portion of the system as a condenser.

FIG. 1 illustrates an example embodiment of a solar thermal osmosis desalination system 20 in accordance with this disclosure. The system 20 comprises an FO subsystem 22 and an RO subsystem 24, which are demarcated by the dashed line near the bottom of the figure. The system 20 thermodynamically couples the FO 22 and RO 24 subsystems. It is noted that, as used herein, the terms "thermodynamic cycle" or "Goswami cycle" describes a linked sequence of thermodynamic processes that involve transfer of heat and work into and out of the system while varying pressure, temperature, and other variables within the system and "thermodynamic system" or "Goswami system" describes a physical embodiment capable of operating in accordance with the associated thermodynamic cycle.

The FO subsystem 22 comprises each of an absorber 26, one or more energy recovery devices (ERDs) 28, an FO unit 30, a pump 32, a recovery heat exchanger 34, a boiler 36, a distillation column 38, a turbine 40, a refrigeration heat exchanger 42, and a pressure reducing valve 44. Each of those components, with the exception of the one or more ERDs 30 and the FO unit 28, is a component of the Goswami system that is capable of producing both power and cooling.

Output from the absorber 26 at position 1 (see FIG. 1) is a working fluid for the Forward Osmosis subsystem. The working fluid may be any fluid suitable for use in the Goswami cycle as a working fluid and in the FO unit to draw water from a FO feed brine. In an exemplary embodiment, the working fluid comprises a mixture of water ($H_2O$), ammonia ($NH_3$), and carbon dioxide ($CO_2$) (i.e., a $CO_2$—$NH_3$—$H_2O$ solution). At that position in the cycle, the working fluid is considered to be a "strong" solution as it contains a relatively high concentration of solutes, such as ammonia and carbon dioxide.

As shown in FIG. 1, the working fluid that exits the absorber 26 is delivered by a delivery line (e.g., pipe or conduit) to the one or more ERDs 28, which act as a pressure exchanger within the solar thermal osmosis desalination system 20. The one or more ERDs increase the pressure of the working fluid before it enters the FO unit 30. Notably, in cases in which the FO unit 30 can properly operate at lower pressures (e.g., near ambient pressure), the one or more ERDs 28 can be omitted or bypassed.

The FO unit 30 is designed to use the working fluid with a draw solution because that solution helps the unit reach higher osmotic pressures. The FO unit 30 includes a semi-permeable membrane 46 that divides the unit into two sides and separates solutes from water. On a first side of the membrane 46, FO feed brine (i.e., a water solution having a high-concentration salt (NaCl)) is received as input (i.e., feed water). Through the osmotic process, water within the brine passes through the membrane 46 as a draw solution but salt contained within the brine is rejected so that the water that has passed through the membrane (i.e., draw solution) has a low concentration of salt. As result of this process, output from the first side of the FO unit 30 is a concentrate having a very high concentration of salt, while and output from the other side of the unit is the working fluid to which draw solution has been added. The working solution then passes again through the one or more ERDs, which lowers the pressure of the fluid, and is then drawn (at position 2) into the pump 32.

The pump 32 drives the working fluid to the recovery heat exchanger 34. Within the heat exchanger 34, the working fluid is heated through heat transfer from another flow of the working fluid at different position within the thermodynamic system. Specifically, flowing through the other side of the heat exchanger 34 is a high-temperature weak solution of the working fluid that has been output from the distillation column 38. The strong solution working fluid driven by the pump 32 enters the heat exchanger 34 at a temperature of approximately 30 to 40° C., while the weak solution working fluid output from the distillation column 38 (at position 8) enters the heat exchanger at a temperature of approximately 95 to 150° C. After exiting the heat exchanger 34 (at position 3), the strong solution working fluid has a temperature of approximately 90 to 145° C., while the weak solution working fluid (at position 10) has a temperature of approximately 35 to 45° C. While the heat exchanger 34 functions to preheat the strong solution working fluid before it enters the boiler 34, the more important function the heat exchanger serves in the system 20 is reducing the temperature of the weak solution working solution before it enters the absorber 26.

The strong solution working fluid is next delivered to the boiler 36, which acts like a further heat exchanger. In addition to that working fluid, the boiler 36 receives a flow of different working fluid that has been heated using a solar thermal energy. In some embodiments, the working fluid heated by solar thermal energy has a temperature of approximately 80 to 250° C. when it enters the boiler 36 (at position 11), and has a temperature of approximately 60 to 220° C. when it exits the boiler (at position 12). Once the working fluid has exited the boiler 36 (at position 4), it has a temperature of approximately 70 to 240° C.

The strong solution working fluid next enters the distillation column 38, which is also heated by a working fluid heated by solar thermal energy. Although the majority of the solar thermal energy may be transferred to the boiler 36, the highest temperature heat can be provided to the distillation column 38. The working fluid heated by solar thermal energy enters the distillation column 38 (at position 15) at a temperature of approximately 90 to 300° C. and exits the distillation column (at position 16) at a temperature of approximately 80 to 250° C.

The heat from the high-temperature working fluid vaporizes some of the strong solution working fluid and its volatile solutes become gaseous. The vapor, e.g., a superheated gaseous mixture of ammonia and carbon dioxide, can be used to generate power and cooling. The vapor exits the distillation column 38 (position 5) at a temperature of approximately 80 to 290° C. and a pressure of approximately 3 to 10 bar. Because solutes, such as ammonia and carbon dioxide, are removed from the working fluid, the concentration of those solutes within the working fluid is reduced. Accordingly, the strong solution working fluid that entered the distillation column 38 becomes a weak solution working fluid.

The weak solution working fluid is output from the distillation column 38 (at position 8) and is delivered to the recovery heat exchanger 34. As noted above, the working fluid has a temperature of approximately 95 to 150° C. before entering the heat exchanger 34. After passing through the heat exchanger (at position 9), however, the weak solution working fluid has a temperature of approximately 40 to 45° C. Notably, the working fluid is still at a relatively high pressure of approximately 3 to 10 bar. As that pressure is too high for the absorber 26, to which the working fluid will next travel, the working fluid is first passed through a pressure reducing valve 44, which reduces the pressure to approximately 1 to 5 bar (at position 10).

Also output from the distillation column 38 is product water from the integrated FO unit 30 of the solar thermal osmosis desalination system 20. In some embodiments, this water still has ammonia and carbon dioxide concentrations that render the water non-potable. However, the water can be put to a beneficial use, such as crop irrigation. In addition or in the alternative, the water can be used as feed water for an RO unit of the system 20, which is described below.

As noted above, the superheated vapor that exits the distillation column 38 is used to generate power. This is achieved by using the vapor to drive a turbine 40 that is coupled with a power generator. As the vapor drives the turbine 40, it expands such that its pressure and temperature are reduced. In some embodiments, the pressure of the vapor that exits the turbine 40 (at position 6) has a pressure of approximately 3 to 5 bar. Because the vapor is expanded to such a low pressure, the temperature of the vapor drops to approximately −10 to 10° C. The low temperature of the vapor can be used for cooling purposes. The vapor can be passed through the refrigeration heat exchanger 42 to lower the temperature of another working fluid that enters and exits the refrigeration heat exchanger at positions 13 and 14, respectively. For examples, the vapor can be used to lower the temperature of the working fluid from a temperature of approximately 15 to 25° C. to approximately −5 to 15° C. That cooled (refrigerated) working fluid can then be used to cool water output by the system 20 (e.g., from the RO unit described below), or can be used for another beneficial purpose, such as air conditioning.

After exiting the refrigeration heat exchanger 42 (at position 7), the vapor has a temperature of approximately 15 to 20° C. and a pressure of approximately 1 to 5 bar. That vapor is then delivered to the absorber 26 where it mixes with and is absorbed by the weak solution working fluid that exited the pressure reducing valve 44. Because the vapor releases its heat of condensation as it is absorbed, the working fluid rises in temperature. Accordingly, the absorber 26 acts like a condenser in a conventional power plant. Also as a consequence of the absorption of the vapor, the concentrations of ammonia and carbon dioxide within the working fluid increase and, therefore, the weak solution working fluid that entered the absorber 26 exits the absorber (at position 1) as a strong solution working fluid.

The above discussion has described the nature and function of the FO subsystem 22 and the thermodynamic cycle that it incorporates. Discussed next is the RO subsystem 24, which comprises the absorber 26 and an RO unit 50. As described above, heat is generated within the absorber 26 as a result of the absorption of the vapor into the working fluid. While this heat could be rejected by the system 20 as it often is in conventional power plants, in which case the heat is wasted, this heat is instead utilized to heat feed water that is provided to the RO unit 50. In some embodiments, the feed water, which can comprise relatively low salinity seawater or product water output from the FO subsystem 22, enters the absorber 26 at a temperature of approximately 10 to 25° C. but exits the absorber at a temperature of approximately 30 to 40° C. Such heating is beneficial as the pressure that is required to perform RO is reduced if the feed water is heated.

The heated feed water is input into the RO unit 50, which outputs product water that, in some embodiments, has ammonia and carbon dioxide concentrations that are below maximum levels permissible for drinking water. Also output from the RO unit 50 is brine, which can be used in feed brine for the FO unit 30. In such a case, the volume of the concentrate output from the FO unit 30 will have a smaller volume and higher concentration of salt. It is then relatively simple to evaporate the water from the concentrate to obtain salt.

RO typically requires high pressures that, in turn, require large amounts of energy to generate, which increases the costs of the process. However, as electrical power is generated by the turbine 40 in the solar thermal osmosis desalination system 20, that power can be utilized to operate the RO unit 50 to reduce or eliminate its need for external power.

One of the key aspects of the solar thermal osmosis desalination system disclosed herein is that solar thermal energy is utilized for the simultaneous production of water, power, and cooling within the FO subsystem. The power output from that subsystem is utilized to operate the RO unit (of the RO subsystem) to produce additional fresh water, thus reducing the energy consumption of the RO unit and the water's cost. On the power side of the system, the need for a condenser normally required in most power plants is eliminated, thus reducing the cost of the system. In addition, the heat that would normally be wasted in a power plant is utilized to heat the feed water provided to the RO unit, thereby reducing the amount of power that is required to operate the unit. By utilizing all of the solar energy input into the system, the costs of the water and power that are produced are reduced. In addition, the system enables the draw solution of the FO unit to be used as the working fluid of the Goswami cycle, resulting in an integration that results in higher exergy efficiency of the combined system. All of these innovations reduce the cost of the water that is produced by innovative use of solar thermal energy while utilizing the advantages of the membrane desalination.

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A solar thermal osmosis desalination system comprising:
    a forward osmosis subsystem, the forward osmosis subsystem comprising a working fluid, an absorber, and a distillation column in fluid communication with the absorber by a strong solution path, a weak solution path, and a high-temperature path,
        wherein the absorber is configured to output the working fluid by the strong solution path that comprises, in order, one or more energy recovery devices (ERDs), an forward osmosis (FO) unit, the one or more ERDs, a pump, a recovery heat exchanger, and a boiler that delivers the working fluid to the distillation column;
        wherein the distillation column is configured to output the working fluid by the weak solution path that comprises, in order, the recovery heat exchanger and a pressure reducing valve that delivers the working fluid to the absorber;
        wherein the distillation column is configured to output the working fluid by the high-temperature path that comprises, in order, a turbine and a refrigeration heat exchanger that delivers the working fluid to the absorber; and
        wherein the FO unit is configured to receive a FO feed brine on a first side of a semipermeable membrane that divides the FO unit into two sides, to receive the working fluid on a second side of the semipermeable membrane, and to deliver water from the FO feed brine through the semipermeable membrane to the working fluid;
    a reverse osmosis system, the reverse osmosis system comprising a reverse osmosis (RO) unit and the absorber, wherein the RO unit is configured to receive a RO feed brine heated by the absorber and output RO product water; and
    wherein the forward osmosis subsystem is configured to receive solar thermal heat and generate power that can be used to operate the reverse osmosis subsystem.

2. The system of claim 1, wherein the working fluid comprises a $CO_2$—$NH_3$—$H_2O$ solution.

3. The system of claim 1, wherein the FO subsystem is configured to receive the solar thermal heat in the boiler or the distillation column.

4. The system of claim 3, wherein the FO subsystem is configured to receive the solar thermal heat in the boiler and the distillation column.

5. The system of claim 1, wherein the distillation is configured to output distillation column product water.

6. The system of claim 4, wherein the distillation column product water is delivered to the RO subsystem in the RO feed water.

7. The system of claim 1, wherein the distillation column is configured to heat the working fluid and a vapor boils off from the working fluid.

8. The system of claim 7, wherein the turbine is configured to utilize the vapor to generate power for the RO unit.

9. The system of claim 7, wherein the refrigeration heat exchanger is configured to receive expanded vapor that exited the turbine to generate cooling.

10. The system of claim 7, wherein the absorber is configured to receive expanded vapor and the expanded vapor is absorbed by the working fluid output from the distillation column.

11. The system of claim 10, wherein absorption of the expanded vapor into the working fluid within the absorber generates heat and wherein the RO feed water provided to the reverse osmosis unit is heated by the absorber before it reaches the reverse osmosis unit.

12. The system of claim 1, wherein the reverse osmosis unit outputs RO product water and RO product brine.

13. The system of claim 12, wherein the RO product brine is delivered to the FO subsystem in the FO feed brine.

14. The system of claim 1, wherein the solar thermal heat is generated using a low-grade solar thermal field.

15. The system of claim 1, wherein the FO subsystem is configured to receive the solar thermal heat in the boiler and the distillation column and wherein the distillation column is configured to output distillation column product water.

16. The system of claim 15, wherein the distillation column product water is delivered to the RO subsystem in the RO feed water.

17. The system of claim 16, wherein the reverse osmosis unit outputs RO product water and RO product brine and wherein the RO product brine is delivered to the FO subsystem in the FO feed brine.

18. The system of claim 16, wherein the turbine is configured to utilize the vapor to generate power for the RO unit.

19. The system of claim 18, wherein the reverse osmosis unit outputs RO product water and RO product brine and wherein the RO product brine is delivered to the FO subsystem in the FO feed brine.

20. A solar thermal osmosis method, the method comprising providing solar thermal heat and a FO feed brine to a solar thermal osmosis desalination system, wherein the solar thermal osmosis desalination system comprises:
   a forward osmosis subsystem, the forward osmosis subsystem comprising a working fluid, an absorber, and a distillation column in fluid communication with the absorber by a strong solution path, a weak solution path, and a high-temperature path,
      wherein the absorber is configured to output the working fluid by the strong solution path that comprises, in order, one or more energy recovery devices (ERDs), a forward osmosis (FO) unit, the one or more ERDs, a pump, a recovery heat exchanger, and a boiler that delivers the working fluid to the distillation column;
      wherein the distillation column is configured to output the working fluid by the weak solution path that comprises, in order, the recovery heat exchanger and a pressure reducing valve that delivers the working fluid to the absorber;
      wherein the distillation column is configured to output the working fluid by the high-temperature path that comprises, in order a turbine and a refrigeration heat exchanger that delivers the working fluid to the absorber; and
      wherein the FO unit is configured to receive the FO feed brine on a first side of a semipermeable membrane that divides the FO unit into two sides, to receive the working fluid on a second side of the semipermeable membrane, and to deliver water from the FO feed brine through the semipermeable membrane to the working fluid;
   a reverse osmosis system, the reverse osmosis system comprising a reverse osmosis (RO) unit and the absorber, wherein the RO unit is configured to receive a RO teed brine heated by the absorber and output RO product water; and
   wherein the forward osmosis subsystem is configured to receive solar thermal heat and generate power that can be used to operate the reverse osmosis subsystem.

* * * * *

UNITED STATES PATENT AND TRADEMARK OFFICE
CERTIFICATE OF CORRECTION

PATENT NO. : 12,084,371 B2
APPLICATION NO. : 18/554447
DATED : September 10, 2024
INVENTOR(S) : D. Yogi Goswami et al.

Page 1 of 1

It is certified that error appears in the above-identified patent and that said Letters Patent is hereby corrected as shown below:

In the Claims

Column 10, Claim 20, Line 24, "teed" should be --feed--.

Signed and Sealed this
Eighth Day of April, 2025

Coke Morgan Stewart
*Acting Director of the United States Patent and Trademark Office*